United States Patent [19]

Lapeyre et al.

[11] Patent Number: 4,673,011
[45] Date of Patent: Jun. 16, 1987

[54] STAIRCASE STRINGER FABRICATING APPARATUS

[75] Inventors: James M. Lapeyre, New Orleans; Christopher G. Greve, Covington, both of La.

[73] Assignee: The Laitram Corporation, Harahan, La.

[21] Appl. No.: 765,371

[22] Filed: Aug. 12, 1985

[51] Int. Cl.⁴ .............................................. B27C 5/00
[52] U.S. Cl. .............................. 144/136 B; 144/3 R; 409/158; 409/162; 409/209; 409/218
[58] Field of Search ............... 409/145, 156, 162, 158, 409/190, 205, 209, 213, 218; 144/136 R, 136 B, 2 R, 3 R, 85

[56] References Cited

U.S. PATENT DOCUMENTS

| 769,931 | 9/1904 | Baghurst | 144/144 A |
|---|---|---|---|
| 1,352,196 | 9/1920 | Hunter | 144/136 B |
| 1,808,962 | 6/1931 | Mackay | 144/136 B |
| 2,168,234 | 8/1939 | Onsurd | 409/226 |
| 2,745,449 | 5/1956 | Pearson | 144/136 B |

Primary Examiner—W. D. Bray
Attorney, Agent, or Firm—Pravel, Gambrell, Hewitt & Kimball

[57] ABSTRACT

A staircase stringer fabricating apparatus includes a structural machine frame having a carriage moveably mounted with respect to the frame for supporting an elongated stringer work piece. A track mounted upon the structural frame defines a guide for the carriage so that the carriage can move on a controlled path with respect to the frame. Material working stations, such as wood routers, welding torches or the like are spaced upon the machine frame for simultaneously preparing the work piece with selectively spaced apart tread assembly positions that define the horizontal stair step positions (including the spacing and angular positions) upon the stringer during use. The tread positions are preferably formed responsive to the movement of the carriage and work piece upon the track along the controlled path so that the work stations traverse the work piece. In the preferred embodiment, the wood routers simultaneously make cuts with equal separation in the wooden stringer work piece to which individual treads can be affixed.

21 Claims, 8 Drawing Figures

STAIRCASE STRINGER FABRICATING APPARATUS

GENERAL BACKGROUND

1. Field of the Invention

The present invention relates to the fabricating of staircases and more particularly relates to a method and apparatus for the preparation of staircase stringer portions with selectively spaced tread assembly positions that will define horizontal stair-step tread positions during use.

2. General Background

Staircases normally include one or more longitudinally extending members known as "stringers". The stringers support the horizontal part of the step in the staircase, known as the "tread". A stringer can optionally support a vertical part of a step, the riser.

During the construction of staircases in a modular fashion, a problem arises in that each staircase to be manufactured may not be of the same dimension because of preexisting construction, and/or the custom needs of a particular home or building. In such instances, the length and/or inclination of the stringer can change. Further the horizontal and vertical distances between the treads of the stair-step positions can vary. These changes in configuration can be minute from one manufactured staircase to the next, but tread position changes of even a few inches eliminates the ability to repeatedly manufacture the same staircase in high volume without expensive custom carpentry or custom welding.

Various machines have been patented which relate to machines that work metal, wood and work pieces with multiple material working stations. The Pearson U.S. Pat. No. 2,939,499 entitled "Automatic Machine For Routing Right and Left Hand Stair Stringers" provides an apparatus that uses a carriage upon which are mounted motors that are equipped with routers. The carriages are slideably moveable upon guide rails and powered by a fluid operative cylinder and piston. A mechanism is provided for adjusting the guide plates about their pivots for changing the riser-rung ratio for the stair stringers routed by the machine. The adjustment mechanism includes a block which slides along a fixed guide extending from the back to the front of the main frame of the machine. A lead screw threads through the block and this lead screw is held against axial movement by a thrust bearing. The screw is rotated by applying a crank to the square end at the front of the machine. This apparatus requires an advancement of the stringer to each stair step position so that the router can perform each of the multiple cuts as the stringer is advanced alongs its length. this is unlike the present invention wherein all the cuts are made while the work piece is held by the machine. Intervention by an operator to advance the stringer into multiple successive positions is not required. Additionally, the present invention can quickly adjust the spacing of the tread position on the stringer for each work piece. thus, custom staircases of variable dimensions and with variable tread spacing can be manufactured on a high volume basis.

Another patent showing material working machines using a plurality of work stations such as routers is the Onsrud U.S. Pat. No. 2,168,234 entitled "Grooving Machine".

3. General Discussion of the Present Invention

The present invention provides a staircase stringer fabricating apparatus that can form the stair step tread positions on the stringer as a single operation after the stringer work piece is mounted upon the machine. No operator intervention is required in order to advance the stringer from one stair step position to the next. With the present invention, the cuts (or welds) are preferably made simultaneously by a plurality of work stations as the work piece moves relative to the work stations and upon the frame.

In the preferred embodiment the work stations carry wood routers and the work piece is an elongated wooden stringer. However, it should be understood that variations of the preferred embodiment would include for example the use of a metal stringer work piece and welding torches at each station for welding treads to the stringer.

The preferred embodiment of the present invention includes a structural machine frame upon which is moveably mounted a carriage which supports the work piece. The frame also supports multiple material working stations which prepare the work piece with selectively pre-spaced tread assembly positions that define the horizontal stair-step positions for the staircase treads during use. The stair step positions are preferably formed responsive to a simultaneous movement of the work piece and router work stations with respect to each other. A track is provided on the frame for guiding the movement of the work piece carriage and the working stations with respect to each other along a controlled path which gives precision to the stair step positions formed on the work piece. Thus, the work piece is formed with stair step positions which can be, for example, parallel grooves, each having corresponding, preselected, equally spaced positions with respect to the work piece. The cut grooves are preferably of a constant length, and have a constant angular orientation with respect to the longitudinal axis of the work piece.

In the preferred embodiment, the work stations are moveably mounted upon the frame so that spacing between adjacent work stations can be varied as desired. In the preferred embodiment, the spacing between adjacent stations can be varied simultaneously in controlled, proportional spacing so that the spacing is always the same between adjacent work stations. The spacing is selectively variable with respect to the length of a particular work piece being prepared. Thus, for example, a stringer of any length can be prepared with stair step tread positions which are equally spaced at any value between about six (6") inches, and eight (8") inches apart which might be necessary depending on angular orientation of the stringer and the application or use of the stair.

In the preferred embodiment, the router forms a dovetail groove in the stringer to which a stair step tread can be attached.

The work stations are preferably router carriages mounted upon the frame on one or more elongated, smooth, common rails. Each router carriage is moved upon the rails by an elongated cable section. Each cable is endless, and is wound upon four sets of sheaves including a large multiple diameter sheave assembly. In the preferred embodiment, the spacing between adjacent work stations is maintained equal, yet may be simultaneously adjusted with the multiple diameter sheave assembly. The sheaves of multiple diameter are mounted for rotation on a common axis drive shaft, and an endless cable is wrapped about each sheave. Each cable extends the length of the machine frame so that when the multiple diameter sheave assembly is rotated by the common shaft, two portions (upper and lower) of the same endless cable move in opposite directions with respect to each other. These upper and lower portions of each endless cable are attached respectively to a pair of corresponding work stations. These corresponding work stations move apart, or together the same distance when the multiple diameter sheave assembly is rotated. A single central work station is unattached to a cable and remains static. the first pair of work stations on each side of the static station are mounted to the cable wrapped upon the smallest sheave and thus move the smallest distance when the shaft carrying all the multiple diameter sheaves is rotated. Conversely, the work stations mounted upon the endless cable which is wound about the largest sheave move the greatest distance during rotation.

In the preferred embodiment, the central work station is static and the work stations on either side of the central work station are connected to the cable wound upon the smallest pulley. Each successive pair of work stations moving in a direction away from the static work station are connected to an endless cable wound upon the next largest diameter sheave. Work stations that are farthest from the central static work station are attached to endless cables which are wound about the larger sheaves. Rotation of the cental drive shaft and all of the sheaves simultaneously produces an adjustable spacing of all the work stations with respect to the frame such that, even though the distance between any two adjacent stations is varied, the distance between all adjacent stations is always the same. For example, if the stations are all spaced seven (7") inches apart and the variable diameter sheave assembly rotates a small amount. Spacing between all of the stations might be decreased to six and three quarter (6-¾") inches. To accomplish this, the diameter of the sheaves are selected so that the circumference of each is an integer multiple, starting at "2", of the circumference (or diameter) of "X" inches, the remaining sheaves would have a circumference (or diameter) of "2X", "3X", "4X", etc. respectively.

BRIEF DESCRIPTION OF THE DRAWINGS

For a better understanding of the present invention, reference may be made to the following description of several exemplary embodiments, taken in conjunction with the accompanying drawings, in which.

DETAILED DESCRIPTION OF THE PREFERRED EMBODIMENT

Figure 1:
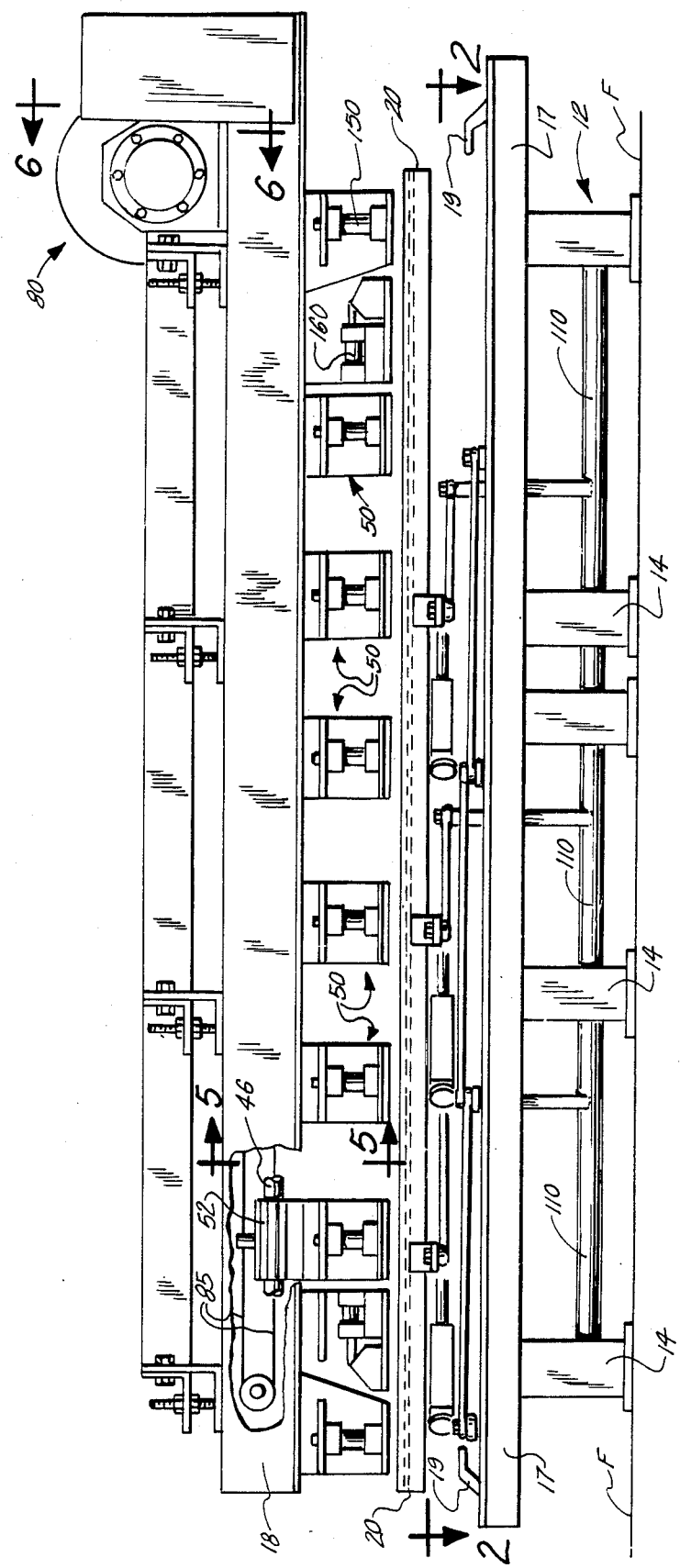
FIG. 1 is a front elevational view of the preferred embodiment of the apparatus of the present invention.
Figure 2:
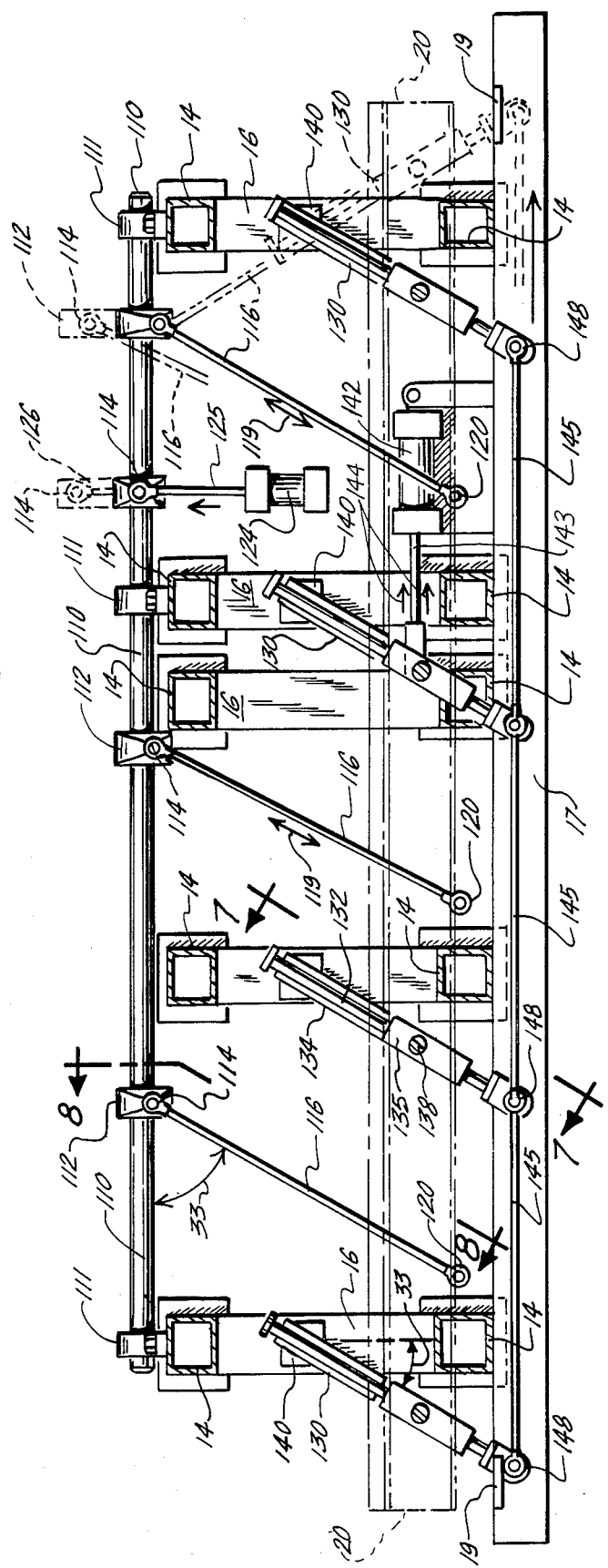
FIG. 2 is sectional view taken along line 2—2 of FIG. 1.

FIGS. 1 and 2 best illustrate the preferred embodiment of the apparatus of the present invention designated as numeral 10. Staircase stringer fabricating apparatus 10 includes a structural machine frame 12 having a plurality of support legs 14 which support multiple horizontal or cross beams 16. The legs can have feet for abutting the floor F.

The Frame 12 includes a forward lower section 17 having stops 19 at its end portions which define the angular movement of track assemblies 130 (FIG. 2-7) as will be discussed more fully hereinafter. Frame 12 also includes an upper superstructure portion 18 which supports multiple work stations which in the preferred embodiment are router carriages 50 (FIGS. 1 and 5).

Figure 3:
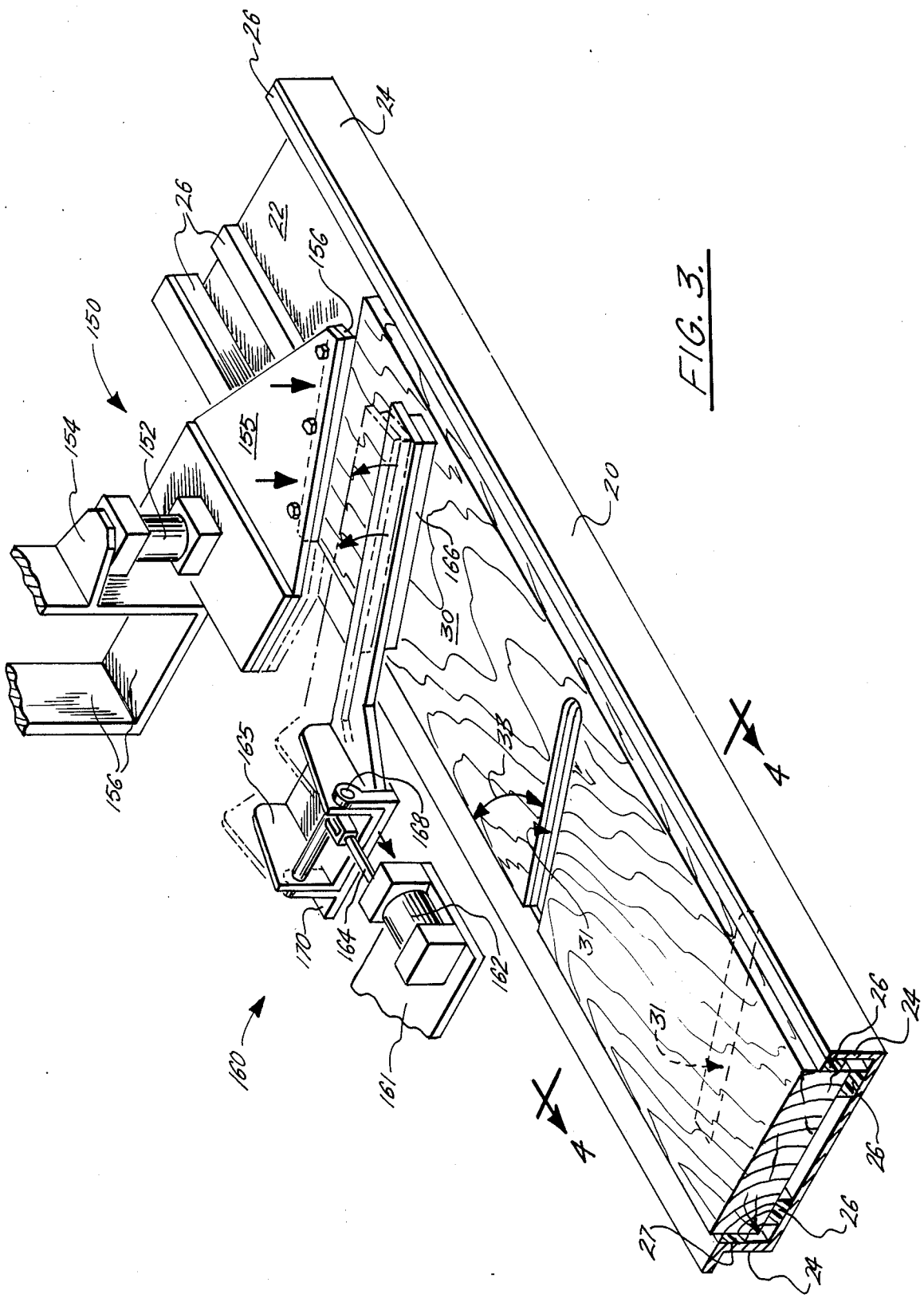
FIG. 3 is a perspective fragmentary view illustrating the work piece and its position during operation within the work piece carriage.

A work piece 30, preferably an elongated wooden stringer, is supported by an elongated work piece carriage 20 which is channel shaped, having a base plate or web portion 22, and side flanges 24, 27. Elongated resilient strips 26 of rubber or nylon, for example, are positioned upon web 22 and side flanges 24, 27 (FIGS. 3-4).

Figure 4:
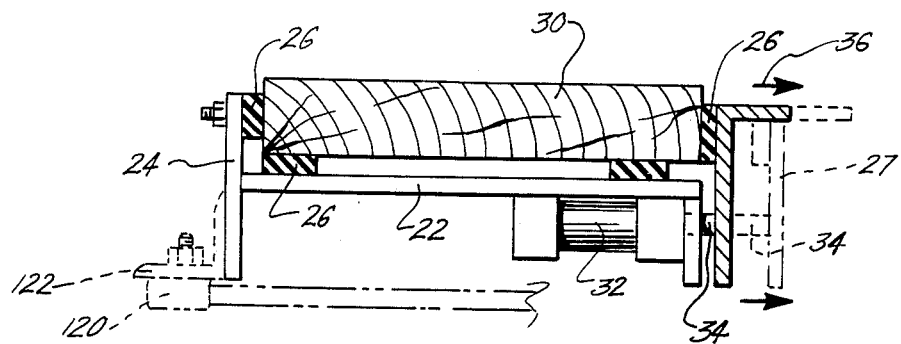
FIG. 4 is a sectional view taken along lines 4—4 of FIG. 3.
Figure 5:
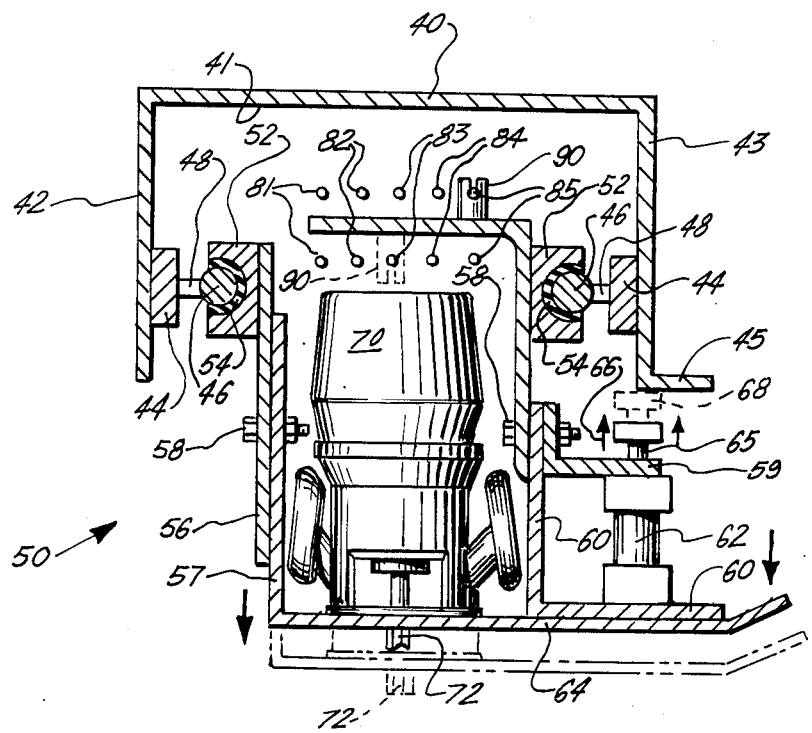
FIG. 5 is a sectional view taken along lines 5—5 of FIG. 1.

Pneumatic cylinder 32 has a moveable push rod 34 which is attached to clamping flange section 27 so that movement of push rod 34 as indicated by the arrows 36 in FIG. 4 causes the flange section 27 to move between positions which selectively clamp work piece 30 against the side flange 24 (FIG. 4).

Superstructure 18 of frame 12 includes an elongated stationary rail support section 40 comprised of a horizontal section 41 and two spaced apart vertical sections 42, 43. Vertical sections 42, 43 carry support brackets 44 to which are affixed posts 48 and elongated router carriage rails 46. Rails 46 provide an elongated cylinder surface upon which router carriage 50 can slideably move in a longitudinal surface upon frame 12. As will be described more fully hereinafter, this sliding movement allows selective positioning and spacing of each router work station 50 with respect to work piece 30 so that equally spaced apart grooves 31 can be cut in work piece 30 at distances which are of a pre-selected spacing.

Rail support 40 includes a laterally extending brake plate surface 45 which cooperates with a brake pad 68 of brake assembly 62. Push rod 65 of brake assembly 62 can extend brake pad 68 to engage plate 45, stabilizing router work station 50 in a particular desired position so that the cut 31 formed in work piece 30 will be precise.

Each router carriage 50 includes a pair of spaced apart bearing assemblies 52 which engage and ride upon rails 46. Bearing assemblies 52 include plastic sleeves 54 of a low coefficient of friction material such as Teflon, for example. Each router carriage 50 is further formed of side wall upper section 56 which is adjustably connected to side wall section 57 by means of bolted connection 58. Top section 61 of router carriage 50 can be for example an elongated angle section with angularly connected flange portions. Top section 61 is connected to brake support 60 with bolted connection 58. Bolted connection 58 also forms a connection between top plate 61 and brake supports 59, 60. Bottom plate 64 is integrally connected to side wall lower section 57. Bottom plate 64 supports router 70 which can be bolted thereto for example. Router 70 is equipped with a removeable bit 72 extending through and below plate 64. Bit 72 can be of any desired configuration, depending upon the groove 31 configuration desired. Bottom plate 64 can be adjustable with respect to rail support 40. For example, bolted connections 58 could be made through slots formed in side wall sections 56, 58, as well as through top section 61 and brake support 60.

Each router carriage 50 slides upon rails 46 as aforedescribed. Each particular carriage 50 is moved with a cable 81-85 which attaches to cable clamp 90, affixed to the upper surface portion of the router carriage and more particularly plate 61. In FIG. 5, a cable clamp 90 is shown. This sectional view (FIG. 5) also shows five (5) other endless cables 81-85. Notice that each cable 81—85 includes an upper portion and a lower portion. In FIG. 1, a side view illustrates a particular endless cable which is wound upon cable support sheaves, illustrated in FIGS. 1 and 6. In the preferred embodiment, eleven (11) work stations in the form of router carriages 50 are provided, each carriage 50 having its own router 70. The number of carriages 50 is of course optional. Since there are five (5) endless cables 81-85, the central most carriage 50 is static. Each cable 81-85 has a pair of router carriages 50 attached to it. Thus, a particular router carriage 50 can have a cable clamp 90 extending above the upper surface of top plate 61, or the cable clamp 90 can extend below the upper surface of plate 61 as shown by the phantom lines in FIG. 5. Since the upper and lower portion of each endless cable 81-85 moves in a different direction responsive to the rotation of multiple diameter sheave assembly 80, the pair of router carriages 50 attached to a particular endless cable 81-85 will move apart or together the same distance depending upon the direction of rotation of the multiple diameter sheave assembly 80.

Multiple diameter sheave assembly 80 includes individual sheave portions 91-95, of different diameters which correspondingly have cables 81-85 wound thereupon. The outer peripheral surface of each sheave 91-95 can be grooved with a semi-circular groove corresponding in shape to the cross-sectional configurations of the cables.

Figure 6:
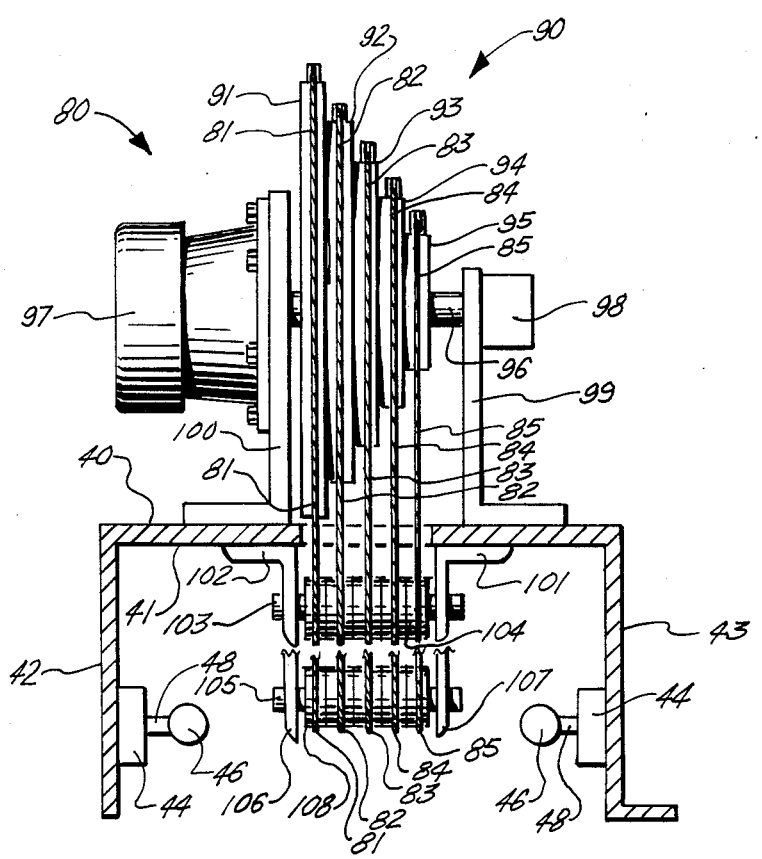
FIG. 6 is a sectional view taken along lines 6—6 of FIG. 1.

Multiple diameter sheaves 91-95 are fixed for rotation with drive shaft 96. A gear box or motor assembly 97 is shown in FIG. 6, attached to one end portion to bearing 98. A pair of spaced apart brackets 99, 100 respectively support bearing 98 and motor/gear box 97.

Each cable 81-85 is endless and extends below the surface of horizontal section 41 into the space defined generally by vertical sections 42, 43 of rail support 40. The cross-sectional positions of cables 81. 85 with respect to rail support 40 and with respect to each router carriage is seen in FIG. 5. It should be understood that each router carriage 50 is preferably indentically sized so that for all practical purposes, the plurality of router carriages 50 and the plurality of routers 70 would be interchangeable.

A pair of sheave supports 101, 102 are affixed to the under surface of horizontal section 41, supporting axle 103 upon which is mounted a first idler roller sheave 104 contacted by each of the cables 81-85 after the cables 81-85 leave multiple diameter sheave assembly 80. A second idler roller 108 is mounted upon axle 105 supported by brackets 106, 107. Similarly, cables 81-85 are supported by idler roller 108. For purposes of reference, the idler roller 104 is wrapped by cables 81 -85 which leave multiple diameter sheave assembly 80 in a clockwise direction (when viewed from the front of the machine as shown in Figure 1). The counter-clockwise wrap of cables 81-85 is wound upon idler 108. A return idler roller 109 is positioned upon frame 12 at the opposite end portion of the frame from multiple diameter sheave assembly 80 (FIG. 1). One skilled in the art will notice that rotation of the multiple diameter sheave assembly 80 in one direction will cause the router carriages 50 to converge toward the central, static router carriage. A rotation of the multiple diameter sheave assembly in the opposite direction, will cause the router carriages 50 to diverge.

Because of multiple diameter sheaves 91-95, router carriages 50 mounted upon cable 85 will move a smaller distance. The largest movement of carriages 50 will be those carriages mounted upon the cable 81 which is wound upon largest variable diameter sheave 91.

In a preferred embodiment, a central router carriage 50 is static. The next pair of router carriages 50 is mounted on each immediate side of the central static router carriage and would be connected respectively to the upper and lower portions of cable 85 wound upon the smallest sheave 95. The next pair of router carriages 50 would be positioned to the left and right of the previous pair of router carriages, one station farther from the central static router carriage station. This progression continues with each router carriage 50 being connected to the corresponding cable 81-85 which carries the next pair of router carriages which are spaced equally from but on opposite sides of the central static router carriage 50.

To provide the same selected spacing between all adjacent work stations, each of the various sheaves 91-95 are selected to have a circumference which is an integer multiple starting at "2", of the smallest sheave 95. For example if the smallest sheave 95 has a circumference of 12 inches, then the next largest sheave 94 would have a circumference of 24 inches, sheave 93 a circumference of 36 inches, sheave 92 a circumference of 48 inches, and sheave 91 a diameter of 60 inches. Thus, for every inch a router carriage connected to cable 85 moves, router carriages connected to cables 84, 83, 82 and 81 will move 2 inches, 3 inches, 4 inches and 5 inches respectively.

When the router carriages 50 are positioned in a desired spacing, the work piece 30 is moved along an angular path which is controlled so that a precisely cut groove 31 defining a stair-step position is formed in work piece 50 by bit 72 at each router 70. In this manner, evenly spaced grooves 31 are prepared in the work piece which are of equal length, of equal cross-sectional configuration, and which define a common angle 33 with the longitudinal axis or edge of work piece 31 (FIG. 3).

In FIG. 3, the phantom lined groove 31 represents a stair-step position defined by a groove on the opposite side of the stringer 30, if the stringer is to be a central stringer such as used in alternating tread stairs of the type disclosed in U.S. Pat. No. 4,199,040 rather than a side stringer of a staircase.

Figure 7:
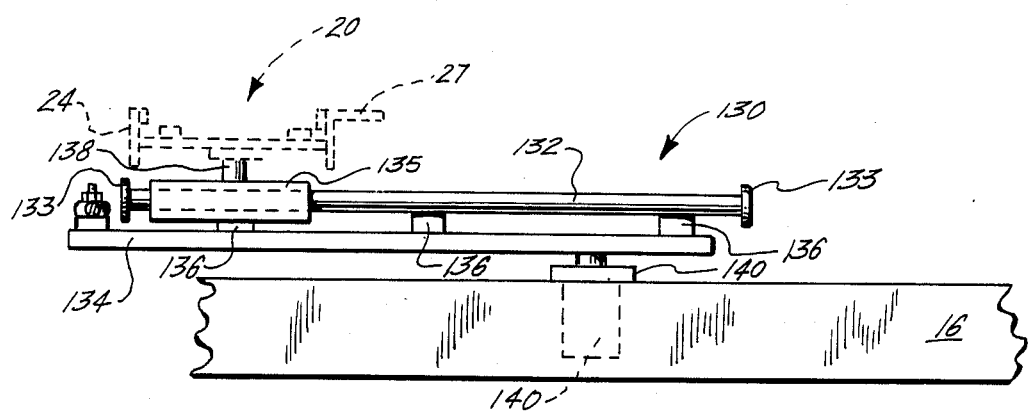
FIG. 7 is a sectional view taken along lines 7—7 of FIG. 2.
Figure 8:
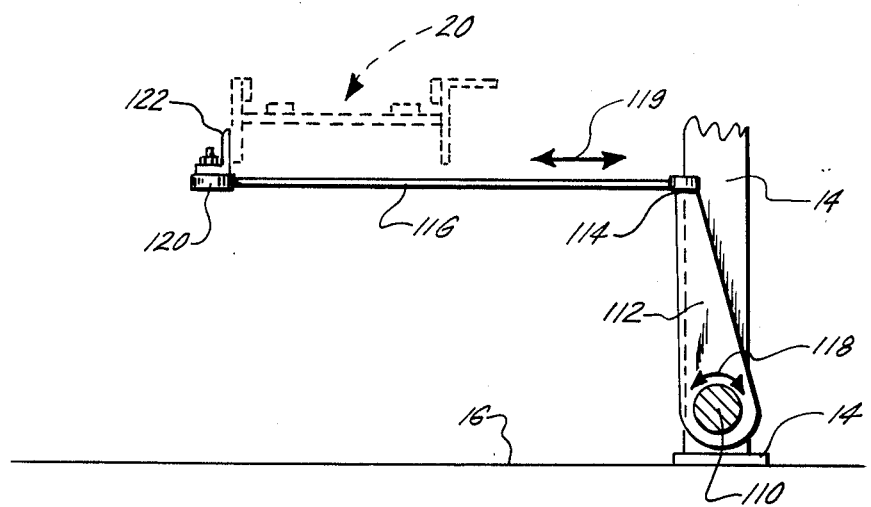
FIG. 8 is a sectional view taken along lines 8—8 of FIG. 2.

Movement of work piece carriage 20 with respect to the router carriages 50 is along a controlled path defined by work piece track assembly 130 (FIGS. 2 and 7). Work piece carriage 20 is moved along the controlled path by hydraulic drive cylinder 124 which rotates drive shaft 110 (FIGS. 2 and 8). As will be described more fully hereinafter, the hydraulic power cylinder 124 causes a rotation of drive shaft 110 which pulls tow bars 116. Tow bars 116 are attached to work piece carriage 20.

Drive shaft 110 is mounted in bearings 111 (FIG. 2). Multiple lever arms 112 are provided on drive shaft 110.

Lever arms 112 each connect to tow bars 116 at ball and socket connections 114 (FIG. 2 and 8). In the preferred embodiment, three lever arms 112 are provided with a coresponding plurality of three tow bars 116. The multiple connections of bars 116 to work piece carriage 20 insure that work piece carriage 20 is moved in a controlled fashion and with load applied equally by the tow bars 116 along the length of work piece carriage 20.

A rotation of lever arm 112 (see curved arrow 118 in FIG. 8) produces a linear movement of tow bar 116 (see arrows 119, FIG. 8). Bars 116 attach to work piece carriage 20 at ball and socket connection 120 at bracket 122. Hydraulic power cylinder 124 has a push rod portion 125 which attaches at ball and socket connection 116 to lever arm 126. Extension and retraction of push rod 125 produces a rotation of lever arm 126, a rotation of drive shaft 110 and corresponding pivotal movement of each lever arm 112.

The angular position of each tow bar 119 defines the angle 33 of groove 31 (see FIGS. 2 and 3). Work piece carriage 20 is supported in a desired elevational position with respect to the frame 12 and also with respect to the routers 70 and bits 72 by work piece track assemblies 130. Each work piece track assembly 130 is mounted upon frame 12 and more particularly upon horizontal beams 16 thereof (see FIGS. 2 and 7).

Each work piece track assembly 130 includes and elongated rail 132 having stop portions 133 at its ends. Elongated rail 132 is supported by base 134 and more particularly by spaced apart rail supports 136. Sleeve 135 rides upon rail 132. Sleeve 135 would be for example a rectangular block having a central cylindrical bore corresponding in section to the outer surface of rail cylindrical 132. An elongated slot (not shown), extending longitudinally along the lower surface of sleeve allows sleeve 135 to pass rail supports 136.

Base 134 is pivotally attached to horizontal beam 16 at pivotal connection 140. Work piece carriage 20 is pivotally attached to sleeve 135 at pivotal connection 138.

The angle 33 of each groove 31 formed in work piece 30 can be varied. Stops 19 (FIG. 2) define the angular position of tow bars 116 and of work piece track assemblies 130. The positions of stops 19 could be varied upon member 17. Reattaching stops 19 at selected positions can be perfected with them such as tack welding, bolting or the like. Normally, stops 19 would be rigidly fixed in a desired angular position so that a large number of staircase stringers 30 could be prepared with grooves 31 of the same angular configuration 33 (FIG. 3). As illustrated by the phantom line position of track assembly 130 in FIG. 2, the stops would be positioned so that the angle 33 would be same if the work piece carriage is moved either to the left or to the right. Movement of the work piece carriage 20 to the left or to the right allows both sides of a particular work piece 30 to be prepared when the work piece 30 is to be supplied with grooves 31 on both sides (see FIG. 3), as when a center stringer 30 for an alternating tread stair is being prepared.

Power cylinder 142 (FIG. 2) is preferably a hydraulic cylinder mounted on frame 12 with a push rod 143 attached to one of the work piece track assemblies 130 (or directly to the work piece carriage 20) by means of a pivotal or ball and socket connection. Arrows 144 in FIG. 2 illustrate the movement of push rod 143 with respect to cylinder 142 so that the work piece carriage 20 can be moved between the left and right positions shown by the phantom lines in FIG. 2.

The end portion of each work piece trace assembly 130 opposite pivotal connection 140 is equipped with a ball and socket connection 148. Tie rods 145 connect end portions of work piece track assemblies 130 together as shown in FIG. 2 with ball and socket connection 148. Pivotal movement of any one work piece track assembly 130 produces a corresponding precise movement of the other work piece track assemblies 130.

FIG. 3 illustrates clamping mechanisms 150 and 160 which firmly secure work piece 30 in carriage 20. Clamp 150 includes a structural support frame 156 having cylinder support 154 laterally extending therefrom toward work piece carriage 20. Hydraulic cylinder 152 moves triangular plate 155 upwardly and downwardly so that alignment guide 156 abuts the end of work piece 30 to hold it securely and prevent longitudinal movement of work piece 30 in carriage 20. A similar clamp 150 could be positioned at each end portion of carriage 20 and of a particular work piece 30.

Clamp mechanism 160 holds work piece 30 within the carriage 20. Clamping mechanism 160 includes a support 161 to which is attached hydraulic cylinder 162 having push rod 164 which pivots bracket 165 responsive to extension and contraction of push rod 164. Bracket 165 rotates about pivot 168 and provides a generally flat plate 170 to which is affixed a lower most removeable pressure plate manufactured of plastic, for example. Alignment guide of clamp 150 would similarly be of plastic. The remaining structural portions of clamps 150, 160 would be of any structural material such as aluminum, steel or the like.

Operation of the machine can be summarized as follows. To operate the apparatus, a work piece is first supported in the carriage 20 (FIG. 3). The work piece is then clamped into position and secured (FIG. 4). A plurality of routers carried by the frame superstructure are selectively positioned so that equally spaced apart grooves can be cut in the work piece (FIGS. 1, 5, 6). The routers are positioned the desired distance apart using sheave assembly 80. Rotation of the sheave assembly 80 proportionally and equally spaces the routers a desired distance apart. After the routers are positioned in the desired spacing, the work piece is moved along an angular path which is controlled so that a precisely cut groove defining a stairstep position is formed in the work piece by the bit of each router. In this manner, evenly spaced grooves 31 are prepared in the work piece which are of equal length, of equal cross-sectional configuration, and which define a common angle with respect to the longitudinal axis of the work piece. A controlled, guided movement of the work piece is defined by the track assembly 130. A hydraulic cylinder 124 rotates drive shaft 110 which pulls tow bars 116. The tow bars are attached to the work piece carriage and they pull the carriage with the work piece upon the carriage and to the routers.

Because many varying and different embodiments may be within the scope of the inventive concept herein taught, and because many modifications may be made in the embodiments herein detailed in accordance with the descriptive requirements of the law, it is to be understood that the details herein are to be intepreted as illustrative and not in a limited sense.

We claim:

1. A staircase stringer fabricating apparatus comprising:

a. a structural machine frame;
b. carriage means movably mounted with respect to the frame for supporting an elongated stringer work piece;
c. material working means including multiple work stations supported by the frame for simultaneously preparing the work piece with multiple, selectively prespaced tread assembly portions that define horizontal stair-step positions of staircase treads during use and including:
  i. track means supported by the frame for guiding the movement of the carriage and working means with respect to each other and upon a controlled path with respect to the frame; and
  ii. power means for moving the carriage means and working means with respect to each other.

2. The staircase stringer apparatus of claim 1 further comprising adjustable spacing means for simultaneously varying the space between the work stations.

3. The staircase stringer fabricating apparatus of claim 1, wherein the work stations are movably mounted upon the frame so that the spacing between adjacent work stations can be simultaneously adjusted to the same preselected value.

4. The staircase stringer fabricating apparatus of claim 3, wherein each work station includes a tool for routing the stringer at a stair-step position with an elongated grooved joint to which a tread can be affixed.

5. The staircase stringer fabricating apparatus of claim 4, wherein the tool is a wood router.

6. The staircase stringer fabricating apparatus of claim 1, further comprising rail means on the frame for slideably supporting the work station on a common linear path.

7. The staircase stringer fabricating apparatus of claim 2, wherein the adjustable spaceing means includes measuring means for simultaneously adjusting the distance between the work stations so that an overall selected distance spanned by all the work stations can be set while maintaining equal spacing of the work stations.

8. The staircase stringer fabricating apparatus of claim 7, wherein the measuring means comprises a plurality of endless cables, each cable supported by a sheave of different circumference and each cable attached to a selected work station, each sheave having a circumference which is an integer multiple, starting at "2", of the smallest sheave to provide said equal spacing.

9. A staircase stringer fabricating apparatus for forming stair step positions on an elongated work piece, comprising:
  a. an elongated frame supporting first and second guide surfaces which are angularly positioned with respect to each other during use;
  b. staircase stringer work piece carriage means mounted to travel on the first guide surface for carrying a stringer work piece upon a guided path at least to a position adjacent the second guide surface;
  c. a plurality of tool means, each mounted for travel on the second guide surface for preparing the work piece with a corresponding plurality of holders that define stair-step positions upon the work piece over a defined overall distance between end stair-step positions; and
  d. adjustable spacing means for selectively varying the overall distance, such as for various rise dimensions and a variable number of stair-step positions, so that the individual tool means and correspondingly the individual stair-step positions are equally spaced.

10. The staircase stringer fabricating apparatus of claim 9, wherein the first runway is at least one elongated rail.

11. The staircase stringer fabricating apparatus of claim 9, wherein the second runway is an elongated railway.

12. The staircase stringer fabricating apparatus of claim 9, wherein the plurality of tool means includes a plurality of spaced apart routers.

13. The staircase stringer fabricating apparatus of claim 9, wherein the adjustable spacing means includes a plurality of endless cables each supported by spaced apart sheaves, including a master sheave with multiple diameter roller surfaces that respectively carry the plurality of cables so that rotation of the cables move different distances responsive to rotation of the master sheave.

14. The staircase stringer fabricating apparatus of claim 13, wherein the master sheave is mounted on a common axis of rotation and has multiple round sheave surfaces of gradual decreasing diameter along the axis.

15. The staircase stringer fabricating apparatus of claim 14, wherein each of the diameters of said multiple diameter roller surfaces are selected to be an integer multiple, starting at "2", of the diameter of the smallest roller surface.

16. A staircase stringer fabricating apparatus for forming holders that form stair step positions on an elongated work piece having a linear longitudinal axis, comprising:
  a. a machine frame;
  b. tool means supported by the frame for preparing the work piece with one or more holders that define stair step positions;
  c. stringer work piece carriage means movably mounted for travel upon the frame;
  d. guide rail means supported by the frame for defining a path of movement for the work piece carriage means that carries the work piece past the tool means at an angle by the work piece longitudinal axis and the stair step position; and
  e. means for moving the carriage means with respect to the tool means.

17. The apparatus of claim 16, wherein the moving means includes a hydraulic cylinder.

18. The apparatus of claim 16, wherein the guide rail means comprises at least one elongated rail slideably supporting the work piece carriage means.

19. The apparatus of claim 16, wherein the carriage means includes holding means for removably securing a work pice to the carrige means.

20. The apparatus of claim 16 wherein the tool means includes a cutting bit.

21. The apparatus of claim 16 wherein there are a plurality of tool means and the work piece carriage carries the work piece simultaneously to a multiple of the tool means.

* * * * *